Jan. 11, 1927. 1,614,448
H. MENSFORTH ET AL
APPARATUS FOR DETERMINING THE ACCURACY OF GEARS AND HOBS
Filed Feb. 10, 1921 3 Sheets-Sheet 2

*Holberry Mensforth &
Frederick Arthur Cowell*
INVENTOR

BY *D.C.Davis*
ATTORNEY

Jan. 11, 1927. 1,614,448
H. MENSFORTH ET AL
APPARATUS FOR DETERMINING THE ACCURACY OF GEARS AND HOBS
Filed Feb. 10, 1921  3 Sheets-Sheet 3
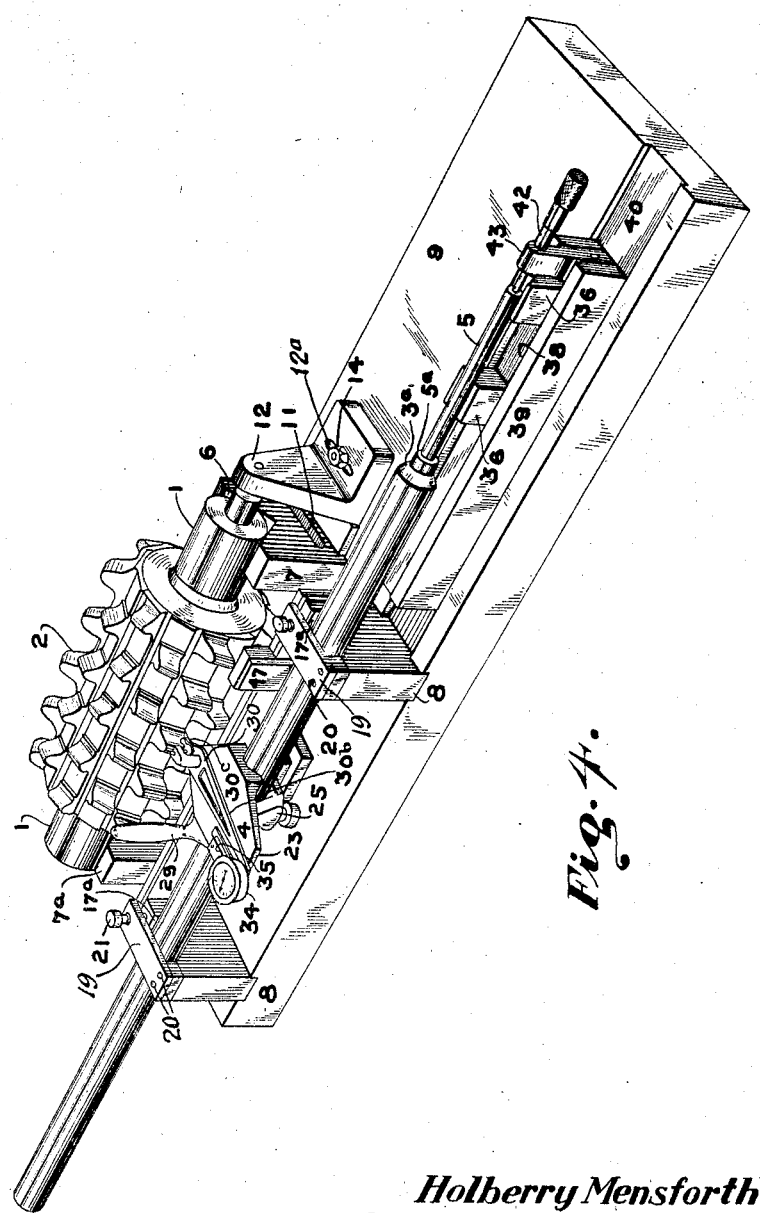
Fig. 4.
Holberry Mensforth &
Frederick Arthur Cowell
INVENTORS
BY 
ATTORNEY Patented Jan. 11, 1927.

1,614,448

UNITED STATES PATENT OFFICE.

HOLBERRY MENSFORTH, OF BOWDON, AND FREDERICK ARTHUR COWELL, OF SALE, ENGLAND, ASSIGNORS, BY MESNE ASSIGNMENTS, TO WESTINGHOUSE ELECTRIC AND MANUFACTURING COMPANY, A CORPORATION OF PENNSYLVANIA.

APPARATUS FOR DETERMINING THE ACCURACY OF GEARS AND HOBS.

Application filed February 10, 1921, Serial No. 443,955, and in Great Britain February 21, 1920.

This invention has for its object to provide an improved device for examining and measuring the accuracy of the teeth of a pinion or of a hub such as is employed for cutting teeth in a gear cutting machine. The improved device comprises essentially two arbors or shafts mounted parallel with one another, preferably in adjustable supports or bearings so that the distance between the two shafts may be varied. One of these arbors is adapted to receive the hob the accuracy of the teeth of which is to be determined or examined, and the other carries the measuring instrument mounted on an adjustable saddle. The device also includes two sets of distance pieces by the use of which the position of the arbor carrying the measuring instrument may be accurately adjusted for each individual tooth of the hob. One set of distance pieces (hereinafter called length gauges) determines the longitudinal position of the arbor carrying the measuring device for each tooth in a longitudinal row of teeth of the hob, and the other set of distance pieces (hereinafter termed lead gauges) determines the position of said arbor with respect to the lead of the teeth btween one longitudinal row and another.

Figure 1:
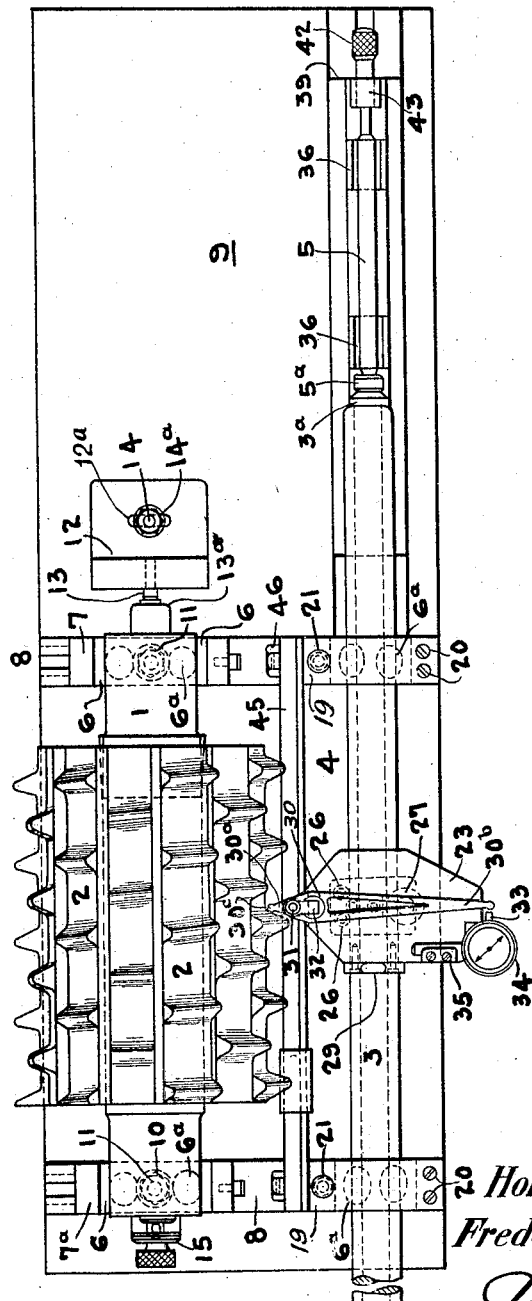
Figure 5:
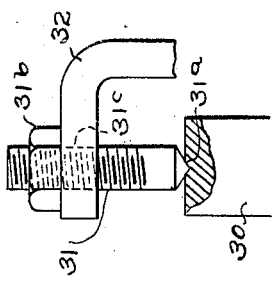

To enable the invention to be more clearly understood it will now be described with reference to the accompanying drawings illustrating one form of the device in accordance with the invention. Fig. 1 is a plan view of the device, Fig. 2 a front elevation thereof, Fig. 3 an end elevation, Fig. 4 a perspective view of the device, and Fig. 5 is an enlarged view of the pivoting means provided for the multiplying lever.

In the drawings, 1 represents the arbor which carries for example a hob 2 the accuracy of the teeth of which is to be examined or measured, and 3 represents the parallel arbor carrying the measuring instrument indicated as a whole at 4. One of the combinations of standard length and lead gauges for accurately determining the position of the measuring instrument 4 with relation to the hob 2 is indicated at 5, 5ᵃ.

The arbor 1 is supported in V-shaped longitudinal notches 6 formed in the upper sides of two bearing blocks 7, 7ᵃ, mounted in accurately machined transverse grooves 8, 8 formed in a base plate 9, bolts 10 passing through slots in the base plate and nuts 11 being provided for clamping the said blocks on the base plate. Hardened steel blocks 6ᵃ are fixed in recesses formed in the faces of the V notches 6, such blocks serving as bearing surfaces for the hob carrying arbor 1. The hob 2 is mounted with a sliding fit on the arbor 1, the latter being provided at one end with a taper portion, as indicated in dotted lines in Fig. 1, upon which the hub is adapted to be frictionally held. The blocks 7, 7ᵃ are adjustable in the grooves 8, in order that the axis of the hob may be arranged parallel to the axis of the instrument arbor 3 and at the correct distance therefrom according to the dimensions of the hob. The longitudinal position of the arbor 1 and therefore of the hub 2, in the V notches 6 is accurately fixed by means of a bracket 12 having a hardened steel stud 13 against which an end piece 13ᵃ provided on the arbor 1 is arranged to bear, the said bracket 12 being adjustable on the base plate 9 in a transverse direction and provided with a bolt 14 passing through a slot 12ᵃ in the base plate 9 and a nut 14ᵃ for clamping the same in position when the stud 13 is in alignment with the arbor 1. The latter is held in contact with the stud 13 by means of a plate spring 15 fastened to the V block 7ᵃ. A screw 16 passing through the spring and engaging the block 7ᵃ is provided for enabling the pressure of the said spring to be removed from the arbor 1.

The arrangement above described enables the hob 2 to be accurately located on the instrument in such a manner that whilst it may be freely rotated, its longitudinal position is accurately fixed.

Figure 3:
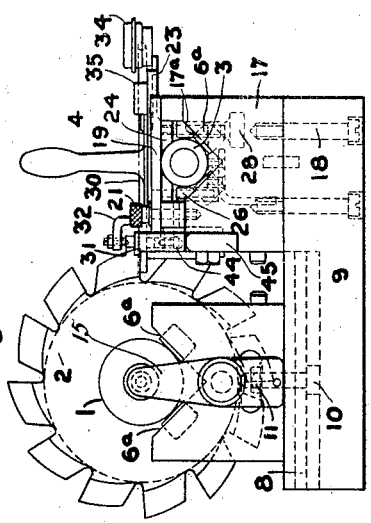

The instrument carrying arbor 3 is advantageously a tube as shown and is mounted in V blocks 17, 17 which are similar to the blocks 3 and are also similarly provided with longitudinal V notches 17ᵃ furnished with hardened bearing faces 6ᵃ as shown in dotted lines in Figs. 1 and 3. The blocks 17 are permanently fixed by means of screws indicated at 18 in the grooves 8 of the base plate 9 in such a manner that the V notches 17ᵃ are in accurate alignment. The said V notches 17ᵃ are provided with bridge pieces 19 attached at one end to the blocks 17 by means of screws 20. The V blocks 17 are provided with milled headed screws 21 passing through the free ends of the bridge pieces whereby the arbor may be clamped in in the grooves 17ª. In setting up the device the adjustable V blocks 7, 7ª carrying the arbor 1 with a hob 2 mounted thereon are accurately located in relation to the fixed V blocks 17, 17 by means of distance gauges (not shown) which are adapted to be inserted in the grooves 8, 8 between the respective pairs of blocks 7, 7ª and 17, 17 the former being finally fixed in their adjusted positions by means of the screws 11 and nuts 11ª. The dimensions of the said distance gauges are in accordance with the diameter of the hob. The bracket 12 is adjusted and fixed on the base plate 9 in accordance with the position of the arbor 1 so that the end 13ª of the arbor 1 is in line with the stud 13, and these are held in contact by releasing the spring 15.

The measuring instrument 4 comprises a saddle plate 23 provided on its underside with longitudinal V grooves 24 the faces of which rest on the arbor 3 (see Figs. 3 and 4). An inverted saddle piece or strap 25 embraces the arbor 3 and is at one end attached to the plate 23 by means of two small screws 26 on one side of the arbor and its other end is attached thereto by an adjusting screw 27 having a milled head 28 for the purpose of clamping the saddle plate 23 to the arbor 3 in any desired position. The plate 23 is provided with an arm 29 by means of which, when the clamping screw 27 is tightened up the measuring instrument may be partially rotated with the arbor 3 for the purpose of engaging the instrument with the teeth of the hob as will be hereafter explained.

Upon the saddle plate 23 there is provided a multiplying lever 30 having two arms 30ª and 30ᶜ and capable of turning in a horizontal plane about a vertical pivot 31 in a standard 32 attached to the plate 23. The pivot 31 is preferably provided with a conical end 31ª in order to provide an accurate centring for the lever 30, and is also preferably adjustable by means of a nut 31ᵇ and screw threads 31ᶜ, as shown in Fig. 5. The shorter arm 30ª of the lever 30 is provided with a spherical nose 30ᵇ constituting a feeler designed to make point contact with the face of the hob teeth for example on the pitch line. The longer arm 30ᶜ of the lever is normally in contact with the actuating plunger 33 of any suitable type of dial indicator or other instrument as shown at 34, the said indicator being mounted on the saddle plate 23 by means of the clamp 35.

Figure 2:
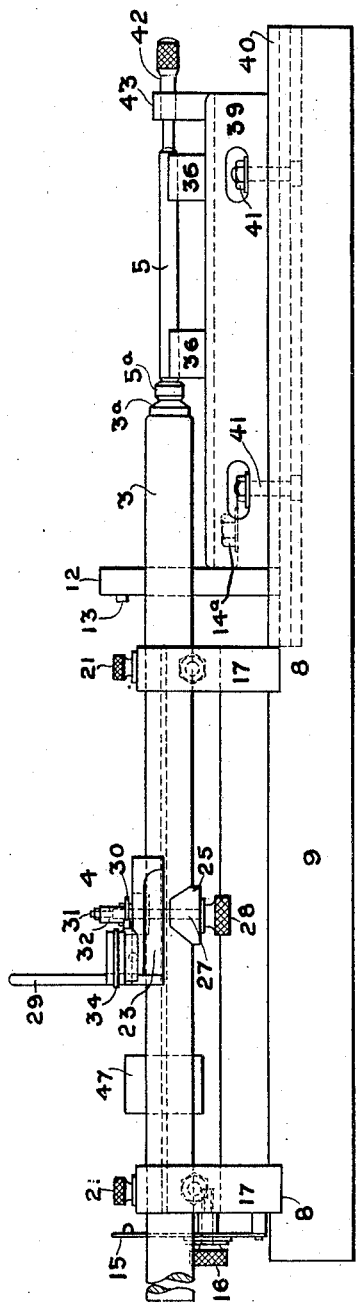

The arbor 3 is approximately twice as long as the arbor 1 and projects beyond the ends of the V blocks 17. The length gauges 5, for accurately locating the measuring instrument 4 with respect to the hob teeth are designed to be inserted in V blocks 36, 36 in axial alignment with the V blocks 17, 17 and the lead gauges 5ª, as clearly shown in the drawings. The V blocks 36 are arranged to slide freely in a groove 38 formed in a block 39 adjustably arranged in a longitudinal groove 40 in the base plate 9, clamping screws and nuts 41 being employed for fixing the block 39 on the base plate as shown in Fig. 2. The longitudinal position of the gauges 5 and 5ª, the arbor 3 and the measuring instrument 4 are initially determined by means of a micrometer screw 42 provided in a bracket 43 on the end of the block 39.

The distance gauges as already set forth consist of two sets, one set being the "length gauges" 5 and determining the longitudinal position of the measuring device for each tooth in a longitudinal row of teeth of the hob whilst the other set, termed "lead gauges" 5ª determine the position of the measuring instrument with respect to the teeth in one convolution and such gauges are used in combination two at a time, that is to say, one length gauge and one lead gauge so that all the teeth in a hob may be examined. The lead gauges are each provided with a finally lapped surface and, at one end, with a circular recess which cooperates with the finally lapped projecting portion of a plug 3ª which is let into the end of the arbor 3 and which maintains the lead gauge in its proper position.

When in use it is essential that the two-armed lever 30 shall be truly horizontal, and this condition is obtained by means of a stop 44 (see Fig. 3) arranged on the saddle plate 23 beneath the pivot 31, the said stop being designed to make contact with, and rest upon, the upper horizontal surface of a bar 45, arranged parallel to the arbor 3, which may conveniently be attached to the rear faces of the V blocks 17, by means of bolts 46 as shown. The height of the upper surface of the bar 45 above the base plate 9 is such that when the stop 44 is in contact with the said bar the lever 30 is in the same horizontal plane with the axis of the hob. The position of the cutting face of each tooth of the hob is determined by means of a channelled block 47 sliding upon the bar 45, and the height of the upper surface of said block is arranged so that the cutting face of a tooth in contact therewith is also in the same horizontal plane as the lever 30 and the axis of the hob. The block 47 is adapted to be slid along the bar 45 and to be engaged in succession by each hob tooth which is to be tested.

The instrument is used in the following manner:—

The hob 2 is rotated on its supporting arbor 1 until the cutting face of one of the teeth rests on the setting block 47. The appropriate length gauge 5 for the particular tooth of the hob to be measured is placed in position on the V blocks 36, and the micrometer screw 42 is adjusted so that whilst the arm 30ª of the lever 30 is in contact with the face of the tooth say, on the pitch line, and the stop 44 is resting on the bar 45, a zero reading is obtained on the indicator instrument 34. The ratio of the two arms of the lever 30 is preferably 1:10 in order that the reading of the micrometer 34 may be easily computed. To determine the relative error of lead of each individual tooth in the same longitudinal row the appropriate length gauges 5 for the teeth in that row are successively placed in position in the blocks 36 so as to adjust the position of the instrument carrying arbor 3 for each of said teeth, the error, if any, in the lead of each tooth in the row so measured being separately ascertained and, if desired, recorded. To measure the error in the lead of the teeth in another longitudinal row the appropriate lead gauge 5ª which allows for the proper amount of lead of teeth in said row relative to the corresponding teeth in the former row, is substituted for the lead gauge used for examining the teeth in the former row. The appropriate length gauges 5 for the teeth in this row are then successively placed in position and the error in the lead, if any, of each tooth in this row will be indicated by the indicator and can be recorded. The operation above described may be repeated for each of the longitudinal rows of teeth of the hob. The appropriate lead gauges 5ª being employed for several rows of teeth together with the appropriate length gauges 5 for each tooth.

Instead of proceeding in the manner above described and examining and measuring distances between successive teeth in a longitudinal row the successive measurments may be taken in a spiral direction in which case a length gauge will be maintained in position and lead gauges successively inserted, the hob being rotated through the necessary corresponding angle between each measurement.

For convenience the device has been described in connection with a hob in which the fluting is parallel with the axis of the hob, that is to say, the cutting faces of the teeth are parallel with the hob axis. In many hobs the fluting of the teeth takes a spiral form so that the cutting faces on all of the teeth are perpendicular to the lead of the hob in which they are cut. A measuring device constructed in accordance with this invention can, however, readily be adapted for measuring the error in lead of the teeth of hobs with spiral fluting. When this is to be done the method employed is as follows. The teeth are measured in what may still for convenience be termed longitudinal rows, but each tooth in the row is individually brought into contact with the setting block 47 whilst under examination. The rotary movement of the hob necessary to place each tooth on the setting block is allowed for in the dimensions of the length gauges 5 which determine the position of the measuring instrument. The instrument may be used for measuring the longitudinal pitch of the teeth of a gear pinion, that is to say, in place of the hob, a pinion may be mounted on the arbor 1 and the lever 30 caused to engage with each tooth of the pinion along a longitudinal line. The block 47 is removed when the device is being used to measure the pitch of the teeth of gear pinions.

It will be understood that the constructional details of the instrument may be varied without departing from the scope of the invention.

Having now particularly described and ascertained the nature of our said invention and in what manner the same is to be performed, we declare that what we claim is:—

1. A device for testing helically toothed objects, comprising a support for the object permitting it to rotate about its longitudinal axis, a pointer adapted to engage the teeth of the object, means for supporting the pointer so as to permit it to move longitudinally with respect to the object, a stop adapted to be engaged by any one of the teeth of the object and so arranged with respect to the pointer support as to present a similar point on each tooth to the pointer, and means for locating said pointer in a plurality of positions in a longitudinal direction in accordance with the true helical lead of the teeth of the object.

2. A device for testing helically toothed objects, comprising a support for the object permitting it to rotate about its longitudinal axis, a pointer adapted to engage the teeth of the object, means for supporting the pointer so as to permit it to move longitudinally with respect to the object, a stop adapted to be engaged by any one of the teeth of the object, said stop being so arranged with respect to the pointer support means as to present a similar point on each tooth to the pointer, and gauges of different lengths corresponding to the true helical lead increment of the teeth around a convolution for determining the longitudinal position of the pointer with respect to the support for the object.

3. A device for testing helically toothed objects, comprising a support for the object permitting it to rotate about its longitudinal axis, a pointer adapted to engage the teeth of the object, means for supporting the pointer so as to permit it to move longitudinally with respect to the object, a stop adapted to be engaged by any one of the teeth of the object, said stop being so arranged with respect to the pointer support means as to present a similar point on each tooth to the pointer, a plurality of gauges of different definite lengths corresponding to the increment of the true longitudinal pitch of the helical toothed object, and means cooperating with said gauges for locating the pointer in a plurality of positions in a longitudinal direction with respect to the support for the object in accordance with the true helical lead of the teeth of the object.

4. A device for testing helically toothed objects, comprising a support for the object permitting it to rotate about its longitudinal axis, an indicating pointer adapted to engage the teeth of the object, an arbor for supporting the pointer movable longitudinally with respect to the object and mounted parallel with the longitudinal axis of the object, a stop adapted to be engaged by any one of the teeth of the object and so arranged with respect to the arbor as to present a similar point on each tooth to the indicating pointer, a fixed abutment in alignment with the arbor, a plurality of gauges of definite lengths corresponding to the longitudinal pitch increments of the convolutions of the teeth of the object, and a plurality of gauges of definite lengths corresponding to the helical lead increments of the teeth of the object around one convolution thereof, the said gauges being adapted to be inserted in combination between said fixed abutment and the end of said arbor for determining the longitudinal position of the indicating pointer in relation to the teeth of the object.

5. A device for testing helically toothed objects, comprising a support for the object permitting it to rotate about its longitudinal axis, a pointer adapted to engage the teeth of the object, means for supporting the pointer so as to permit it to move longitudinally with respect to the object, and means for locating the indicating pointer in a plurality of positions in a longitudinal direction with respect to the object in accordance with the true helical lead increments of the teeth of the object around one convolution thereof.

6. A device for testing helically toothed objects comprising a mounting for rotating said object about its longitudinal axis, an indicating pointer adapted to engage the teeth of the object, an arbor for supporting the pointer movable longitudinally with respect to the object and mounted parallel with the axis of the object, a relatively fixed abutment in alignment with said arbor, two sets of gauges of definite lengths corresponding respectively to the helical lead and longitudinal pitch increments of the teeth, said gauges being changeably located in different combinations between said abutment and the end of the said arbor, and means for adjusting the position of said abutment to obtain a datum reading of the indicating pointer from which a series of measurements may be initiated.

7. A device for testing helically toothed objects, comprising a support for rotating the object about its longitudinal axis, an indicating pointer adapted to engage the teeth of the object, means for so supporting the pointer as to permit it to move longitudinally with respect to the object, a stop adapted to be engaged by any one of the teeth of the object, said stop being so arranged with respect to the pointer support as to present a similar point on each tooth to the indicating pointer, and a set of gauges of gradually increasing lengths corresponding with the increments of the helical lead of the teeth for determining the position of the indicating pointer.

8. A device for testing helically toothed objects, comprising a support for rotating the object about its longitudinal axis, an indicating pointer adapted to engage the teeth of the object, an arbor for supporting the pointer movable longitudinally with respect to the object and mounted parallel with the longitudinal axis of the object, a bar fixed between the object and the arbor in parallel spaced relation, a stop slidably mounted on the bar and adapted to be engaged by one of the teeth of the object so as to fix the object against rotation in one direction, and a plurality of gauges of definite lengths corresponding to longitudinal pitch increments together with a plurality of gauges of different lengths corresponding to helical lead increments adapted to determine the longitudinal position of said arbor with respect to the object.

9. A device for testing helically toothed objects, comprising a support for rotating the object about its longitudinal axis, an indicating pointer adapted to engage the teeth of the object, an arbor for supporting the pointer movable longitudinally with respect to the object and mounted parallel with the longitudinal axis of the object, a bar fixed between the object and the arbor in parallel spaced relation, a stop slidably mounted on the bar and adapted to be engaged by one of the teeth of the object so as to fix the object against rotation in one direction, and means including length gauges for positioning said arbor longitudinally with respect to the object in successive positions corresponding to the helical lead and the longitudinal pitch of the teeth of the object.

In testimony whereof, we have hereunto subscribed our names.

HOLBERRY MENSFORTH.
FREDERICK ARTHUR COWELL.